Patented May 10, 1949

2,469,888

UNITED STATES PATENT OFFICE 2,469,888

ORGANO-POLYSILOXANES

Winton I. Patnode, Schenectady, N. Y., assignor to General Electric Company, a corporation of New York No Drawing. Application October 29, 1942, Serial No. 463,814

24 Claims. (Cl. 260—448.2)

This invention relates to new organo-silicon compounds, mixtures of which are particularly useful as lubricants, and to a process of preparing such compounds. It is particularly concerned with, and has as its primary object, the preparation of liquid, oily organo-polysiloxane chain compounds having the general formula $$R_{(2a+2)}Si_aO_{(a-1)}$$

in which the various R's represent the same or different lower monovalent hydrocarbon radicals selected from the class consisting of lower alkyl, aryl, alkaryl, and aralkyl radicals, examples of which are the methyl, ethyl, propyl, phenyl, benzyl, tolyl, xylyl, etc. radicals, and $a$ is a whole number and is equal to at least 3. Preferably the majority of the R's represent methyl groups when the resulting compounds are used as lubricants.

The term "polysiloxane" as used herein refers to the fact that the compounds so designated have a skeletal structure of alternate atoms of silicon and oxygen. The structure may be either of the straight or branched chain type. A type formula for the linear or straight chain compounds falling within the scope of this invention is

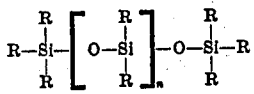

where the various R's have the same significance as noted above, and $n$ is an integer equal to at least one.

A type of formula for the simpler branched chain type of compound is

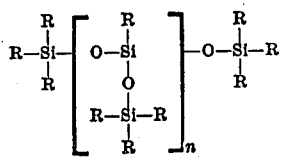

where R and $n$ have the same significance as noted above.

As an example of the more complex type of branched chain polysiloxane falling within the scope of this invention, the following is given:

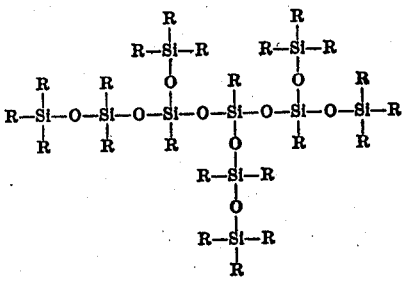

The scope of the invention is further and specifically defined, and the compounds falling within it are distinguished from all other known organo-silicon compounds, by the following criteria:

1. Each silicon atom is joined to at least one other silicon atom through an oxygen atom.
2. Oxygen atoms are found only between silicon atoms.
3. The ratio of the number of R groups to the number of silicon atoms is fixed and is equal to $$\frac{2a+2}{a}$$

where $a$ is the number of silicon atoms.

4. Each terminal silicon atom of the skeletal structure is joined directly to three R groups.

Thus it is seen that although the number of individual compounds coming within the scope of the invention is large, the class of compounds is narrowly defined by these four criteria. Since all of the compounds defined by the four criteria have the general formula $$R_{2a+2}Si_aO_{a-1}$$

wherein R and $a$ have the meanings hereinbefore indicated, the oxygen to silicon ratio $$\frac{a-1}{a}$$

of the individual compounds or mixtures thereof is equal to at least ⅔, i. e. at least 0.66, and is always less than 1.

Examples of specific chemical compounds included in this classification are:

1. Octamethyltrisiloxane (CH₃)₃Si—O—Si(CH₃)₂—O—Si(CH₃)₃

2. Decamethyltetrasiloxane (CH₃)₃Si—O—Si(CH₃)₂—
   O—Si(CH₃)₂—O—Si—(CH₃)₃

3. Dodecamethylpentasiloxane

CH₃[(CH₃)₂Si—O]₄Si(CH₃)₃

4. Tetradecamethylhexasiloxane

CH₃[(CH₃)₂SiO]₅Si(CH₃)₃

5. Octaphenyltrisiloxane (C₆H₅)₃Si—O—Si(C₆H₅)₂—O—Si(C₆H₅)₃

6. Decaethyltetrasiloxane (C₂H₅)[(C₂H₅)₂SiO]₃Si(C₂H₅)₃

7. Octabenzyltrisiloxane (C₆H₅CH₂)₃Si—O—Si(C₆H₅CH₂)₂—
   O—Si(C₆H₅CH₂)₃

8. Methyl tri-(trimethylsiloxy) silane

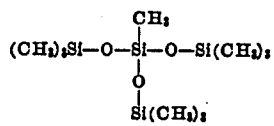

9. Dimethyl tetra-(trimethylsiloxy) disiloxane

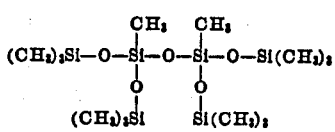

10. Symmetrical 1,3-hexaphenyl-2-dimethyltrisiloxane (C₆H₅)₃Si—O—Si(CH₃)₂—O—Si(C₆H₅)₃

11. Symmetrical 1,3-hexamethyl-2-diphenyltrisiloxane (CH₃)₃Si—O—Si(C₆H₅)₂—O—Si(CH₃)₃

12. 1,3-hexamethyl-2-methyl-2-phenyltrisiloxane (CH₃)₃Si—O—Si(CH₃)(C₆H₅)—O—Si(CH₃)₃

In the system of nomenclature adopted in naming the above compounds, the individual silicon atoms in the Si—O—Si chain have been designated by numerals, the Si—O group in which the oxygen is connected to a second silicon atom has been called a "siloxy" group, and the compound containing them a "siloxane." On this basis the compound H₃Si—O—SiH₃ is known as disiloxane with the prefix indicating the number of silicon atoms in the chain. The system resembles somewhat the Geneva system of nomenclature of organic compounds.

The novel compounds of my invention are useful for diverse purposes. For example, they may be used as intermediates in the preparation of other complex silicon compounds. They may also be used as plasticizers or softeners for various resins, including the silicone resins such as those described and claimed in Patents 2,258,218–222 issued to Eugene G. Rochow. Liquid mixtures of the various compounds represented by the type formulas may also be used as electrical insulating fluids, damping fluids, etc. Such mixtures are particularly useful as lubricants as will be described more fully hereinafter. More complex or resinous silicon compounds may be prepared by treating my compounds in such a manner as to oxidize one or more of the hydrocarbon radicals to form compounds capable of further condensation with one another. The more viscous materials may be used as waterproof impregnating agents by application from solution.

The preferred process employed in the preparation of the novel polysiloxane derivatives briefly comprises treating a mixture of an organodisiloxane having the general formula $$R_3Si-O-SiR_3$$

and a silicone or polysiloxane having the general formula $$R_xSiO_{\frac{4-x}{2}}$$

wherein $x$ is not greater than 2, with a small amount of concentrated sulphuric acid at room temperature, separating the acid layer, and washing tne remaining polysiloxane layer with water.

A second process comprises the hydrolysis of mixtures of organo halogeno-silanes, one member of which is represented by the formula R₃SiX, and the other members of which are chosen from the class R₂SiX₂, RSiX₃, and SiX₄, wherein R has the meaning hereinbefore indicated and X represents a halogen atom. The product of hydrolysis is likewise separated from the acid. In this method of preparation, the average composition of the mixture of hydrolyzable silanes should correspond to the formula $R_bSiX_{(4-b)}$, where $b$ is substantially greater than 2, preferably greater than about 2.5, and is less than 3. For maximum yields of the chain compounds, it may be desirable to follow this hydrolysis process by treatment of all or part of the products with sulphuric acid as described briefly above.

A third general process, especially suitable for introducing phenyl groups into the molecule, comprises treating a mixture of an organodisiloxane of the formula R₃Si—O—SiR₃ and an organo silanediol such as diphenyl silanediol (C₆H₅)₂Si(OH)₂ with a small amount of concentrated sulphuric acid. Other polysiloxanes of which octamethylcyclotetrasiloxane $$[(CH_3)_2SiO]_4$$

boiling at 175° C. is an example, may be added to the starting materials. These cyclopolysiloxanes are more fully described in my copending application S. N. 463,813 filed concurrently herewith and assigned to the same assignee as the present invention.

A fourth general process comprises bringing together, with or without a solvent, a silanol of the type R₃SiOH and an organo-halogeno silane of the type R₂SiX₂. An alternative procedure is to permit a silanediol of the type R₂Si(OH)₂ to react with a monohalide of the type R₃SiX. Other more complex silanols in which the presence of —SiOH groups is noted, but which are so complex as to defy a determination of exact structure, may likewise be permitted to react with halides of the type R₃SiX, or may be caused to react with disiloxanes of the type R₃Si—O—SiR₃.

It is to be noted that all four of these general procedures require as part of the starting material an organo-silicon compound containing the group R₃Si—, which emerges from the reaction as a terminal silicon atom of the skeletal chain or branched chain structure of the molecule. Depending on the starting materials used, the products of the invention may or may not comprise complex mixtures of the various chain compounds which cannot be separated from each other and individually identified by ordinary analytical means. Consequently, in most of the following specific examples illustrating the way in which the invention may be carried out, and describing the novel compounds so produced, I have chosen comparatively simple, chemically pure starting materials which permit a separation of the individual products of reaction one from another. Examples of such simple starting materials are hexamethyldisiloxane $(CH_3)_3Si$—O—$Si(CH_3)_3$, octaphenylcyclotetrasiloxane $[(C_6H_5)_2SiO]_4$, diphenylsilanediol $(C_6H_5)_2Si(OH)_2$, hexamethylcyclotrisiloxane $[(CH_3)_2SiO]_3$, trimethylchlorosilane $(CH_3)_3SiCl$, methyltrichlorosilane $CH_3SiCl_3$, silicon tetrachloride $SiCl_4$, etc.

EXAMPLE 1

An equimolar mixture of hexamethyldisiloxane $(CH_3)_3Si$—O—$Si(CH_3)_3$ and of octamethylcyclotetrasiloxane $[(CH_3)_2SiO]_4$ was shaken with 10 per cent of its weight of concentrated sulphuric acid at room temperature for four hours. The lower layer of acid was separated and the upper layer of polysiloxanes was washed free of acid with water, dried over anhydrous potassium carbonate, and fractionally distilled. The following compounds were separated and identified:

1. Octamethyltrisiloxane
2. Decamethyltetrasiloxane
3. Dodecamethylpentasiloxane
4. Tetradecamethylhexasiloxane The properties of these compounds are set forth in the following table in which the compounds are designated by the above reference numerals.

| Compound | B. Pt., °C. | F. Pt., °C. | $N_D^{20}$ | Molecular weight | |
|---|---|---|---|---|---|
| | | | | Found | Theory |
| 1 | 153 | −82 | 1.3848 | 230 | 236.4 |
| 2 | 194 | −68 | 1.3895 | 302 | 310.5 |
| 3 | 229 | −81 | 1.3925 | 384 | 384.6 |
| 4 | ¹143 | <−100 | 1.3948 | 462 | 458.7 |

¹ 20 mm.

Representative analyses of these compounds are:

| Compound | Found | | | Theory | | |
|---|---|---|---|---|---|---|
| | % C | % H | % Si | % C | % H | % Si |
| 1 | 40.46 | 10.65 | 35.85 | 40.63 | 10.23 | 35.61 |
| 4 | 36.16 | 9.13 | 37.0 | 36.63 | 9.23 | 36.70 |

In addition to the compounds listed, some of which are specifically claimed in my divisional application Ser. No. 653,131, filed March 8, 1946, there remained after fractional distillation a high-boiling residue believed to be compounds of the same series $CH_3[(CH_3)_2SiO]_nSi(CH_3)_3$ where $n$ is larger than 5. It is to be noted that none of the starting compound octamethylcyclotetrasiloxane was found in the products of the reaction. Although in the above example an equimolar mixture of the two reactants was used, the invention is not limited thereto. An increase in the proportion of the disiloxane derivative used is believed to favor the formation of the lower polysiloxane chain compounds, while a decrease in the proportion of disiloxane derivative results in the formation of larger quantities of the products of higher molecular weight not readily separated from each other by distillation.

The following example illustrates an alternative process for preparing compounds of this invention and likewise illustrates the preparation of simple branched-chain derivatives.

EXAMPLE 2

A mixture of methyltrichlorosilane and trimethylmonochlorosilane in the ratio of 0.67 mol of the former to 2.69 mols of the latter compound was hydrolyzed by adding it to 700 c. c. of violently stirred water cooled externally so that the maximum temperature of the reaction mixture was 32° C. Two liquid layers were formed. The lower aqueous layer was discarded, and the upper layer was washed with water and dried over anhydrous potassium carbonate. This liquid was divided by distillation into three portions: (A) chiefly hexamethyldisiloxane, (B) a fraction boiling up to 200° C. at 1 mm. pressure, and (C) a non-volatile oil. Fractions A and C were recombined and shaken with a small quantity of sulphuric acid. The oil was then washed free of acid with water, dried and distilled as before, whereupon more of the (B) fraction was obtained. On fractional distillation of the B fractions, the compound

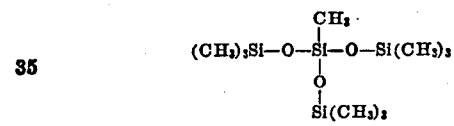

methyl tri-(trimethylsiloxy) silane was isolated and found to have the following properties: B. Pt. 190° C.; $N_D^{20}$ 1.3880; $d_{20}$ 0.8497 g./cc.; Mol. wt. found 316, theory 310.5. Analysis for C, H, and Si gave the following results:

| | Found | Theory |
|---|---|---|
| % C | 38.43 | 38.66 |
| % H | 9.65 | 9.74 |
| % Si | 35.85 | 36.15 |

In addition to methyl tri-(trimethylsiloxy) silane, some hexamethyldisiloxane was isolated, and there remained a relatively non-volatile oil which contained more complex compounds, the simplest of which were probably compounds of the type

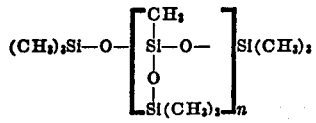

when $n$ is an integer greater than 1.

The following example illustrates a process for preparing compounds of this invention in which the various R's in the general formula are represented by different hydrocarbon radicals, and in which a silanediol of the type $R_2Si(OH)_2$ is used as one of the starting materials.

EXAMPLE 3

A mixture of hexamethyldisiloxane and diphenylsilanediol in the proportions of 41 grams of the former to 54 grams of the latter was agitated with 30 grams of concentrated sulphuric acid for 10 minutes at room temperature. The crystalline diphenylsilanediol is substantially insoluble in the hexamethyldisiloxane, but on shaking with the acid the two materials react to form a single liquid phase which is lighter than the acid. An equal volume of water was added to the two-phase system, which was then extracted with an equal volume of ether. The ether extract was dried over anhydrous $Na_2SO_4$, and the liquid fractionally distilled. The compound, symmetrical 1,3-hexamethyl-2-diphenyltrisiloxane, having the formula $$(CH_3)_3Si\text{---}O\text{---}Si(C_6H_5)_2\text{---}O\text{---}Si(CH_3)_3$$

was isolated. This compound has the following properties: B. Pt. 172–173° C. at 18 mm., $d_{20}$ .9728 g./cc., $N_D^{20}$ 1.4927, mol. wt. found 360, theory 360.4.

| | % H | % C | % Si |
|---|---|---|---|
| Analysis: | | | |
| Found | 7.70 | 58.25 | 23.45 |
| Theory | 7.83 | 59.94 | 23.55 |

The residue remaining in the flask was a viscous liquid at room temperature, and is presumed to contain complex compounds of the type $$(CH_3)_3Si\text{---}[O\text{---}Si(C_6H_5)_2]_n\text{---}Si(CH_3)_3$$

where $n$ is greater than 1.

Example 4 illustrates a further method of preparation of the novel compounds of this invention, also utilizing diphenylsilanediol.

EXAMPLE 4

Twenty-five grams of diphenylsilanediol dissolved in 325 c. c. of ether was added drop by drop below the surface of 25 g. of trimethylchlorosilane dissolved in 100 c. c. of ether. The reaction mixture was stirred violently throughout the addition, which required a period of one hour. After removal of the ether by distillation, the remaining liquid was fractionally distilled. In addition to hexamethyldisiloxane, a yield of 12% of symmetrical 1,3-hexamethyl-2-diphenyl trisiloxane was obtained. The residue in the flask was a viscous, high-boiling liquid which is believed to comprise a mixture of compounds of the type $$(CH_3)_3SiO\text{---}[(C_6H_5)_2SiO\text{---}]_nSi(CH_3)_3$$

where $n$ is an integer greater than 1.

The reactions which take place during the formation of the compounds of this invention depend, of course, upon the nature of the starting materials. When neither of the reactants is a halide, but consist largely of siloxanes, the role of the concentrated sulphuric acid is to open the Si—O—Si linkage followed by recombination of the fragments thus formed in new positions, probably by the momentary formation of esters of sulphuric acid followed by hydrolysis of these esters to form new compounds. This is borne out by the fact that the chemical structure of the new compounds indicates that the R groups attached to a given silicon atom are not separated therefrom at any time during the reaction, but that the breaking and recombination of the parts of the starting materials always takes place at an Si—O—Si linkage. When the starting materials are both organo halogenosilanes in the proper proportions, and the reaction is carried out in water, the reaction is believed to be hydrolysis of the halogen and condensation of any silicols formed resulting in the final polysiloxanes. Any cyclic compounds formed during the reaction and containing the Si—O—Si linkage are opened by treatment with sulphuric acid and recondensed with fragments of other compounds having terminal $R_3Si$-groups to form the desired chain compounds. When one of the starting materials is a halide and the other is a silanol or silanediol, then the reaction is believed to be a splitting out of HCl with the direct formation of a siloxane bond.

Whenever one of the starting materials consists of a compound in which two different hydrocarbon radicals are attached to the same silicon atom, the silicon atoms of the resultant compounds will be similarly substituted. A representative reaction of this type would be that between symmetrical diphenyltetramethyldisiloxane and a cyclic polymer of methylphenylsilanone to form compounds of the formula $$(CH_3)_2(C_6H_5)Si[OSi(CH_3)(C_6H_5)]_nOSi(CH_3)_2(C_6H_5)$$

wherein $n$ is a whole number equal to at least 1.

All of the chain compounds which have been prepared in accordance with this invention are liquid in form. They are to be distinguished from other liquid organo silicon compounds comprising carbon, hydrogen, silicon, and oxygen by their unique properties. For example, whereas esters of silicic acid, such as ethyl silicate or esters of organo substituted silicic acids, likewise are liquids comprising carbon, hydrogen, silicon and oxygen, they are susceptible to hydrolysis by water, often yielding gels or resins. The compounds of the present invention are stable toward water. Furthermore, whereas some of the hydrolysis products of organo halogenosilanes described in U. S. Patents 2,258,218–222 issued to Eugene G. Rochow are liquid in nature, they rapidly become resinous on heating, due, as is pointed out in those patents, to the fact that they comprise compounds in which the ratio of organic radicals to silicon atoms is less than 2. The viscous liquids of the present invention, in which the ratio is greater than 2, are not readily converted to resins on heating, but on the contrary, maintain their liquid form for long periods of heating, thus enhancing their suitability as lubricants or heat transfer media. The simple organodisiloxanes of the type $R_3Si\text{---}O\text{---}SiR_3$, among which is hexamethyldisiloxane, are relatively fluid compounds of low viscosity and low boiling point, or if the R group is very large, contain a disproportionate amount of carbon and hydrogen at the expense of the silicon and oxygen; whereas the compounds of the present invention, having a ratio of R groups to silicon atoms less than 3, possess the desirable properties of the siloxane bond in much greater degree.

Certain substituted cyclopolysiloxanes of the general formula $[R_2SiO]_n$ having an oxygen to silicon ratio of 1 which are further described in my copending application S. N. 463,813 mentioned above, are also liquids but they differ from the compounds of the present invention in certain important characteristics. For example, octamethylcyclotetrasiloxane and decamethyltetrasiloxane are similar in chemical composition in respectively having the formulas $(CH_3)_8Si_4O_4$ and $(CH_3)_{10}Si_4O_3$, and boiling at 175° C. and 194° C. respectively. Their freezing points, however, differ widely, being 17.5° C. and −68° C., indicating the superiority of the chain compound of the present invention in uses where a polysiloxane is subjected to low temperatures, such for example as in a lubricant or damping fluid. A similar unique property of the compounds of the present invention, for example tetradecamethylhexasiloxane, resides in their relatively small change in viscosity with temperature when compared with the much larger change in viscosity with temperature exhibited by the similar cyclic compounds. This difference in properties is likewise found in complex mixtures of the same two types of materials. Various differences between certain straight chain polysiloxanes of the type described herein and the corresponding cyclic or ring type polydimethylsiloxanes are brought out in the following table:

Properties of cyclic polymers $[(CH_3)_2SiO]_n$

| Number of Si Atoms | B. Pt., °C. | F. Pt., °C. | Viscosity, cp. | | Ratio Vis., 25°/75° |
|---|---|---|---|---|---|
| | | | 25° | 75° | |
| 4 | 175 | 17.5 | 2.20 | 0.96 | 2.29 |
| 5 | 210 | −37 | 3.82 | 1.56 | 2.45 |
| 6 | 245 | −2 | 6.88 | 2.54 | 2.71 |

Properties of polymers $CH_3[(CH_3)_2SiO]_nSi(CH_3)_3$

| Number of Si Atoms | B. Pt., °C. | F. Pt., °C. | Viscosity, cp. | | Ratio Vis., 25°/75° |
|---|---|---|---|---|---|
| | | | 25° | 75° | |
| 4 | 194 | −68 | 1.31 | 0.69 | 1.90 |
| 5 | 229 | −81 | 1.83 | 0.93 | 1.97 |
| 6 | ¹142 | <−100 | 2.37 | 1.17 | 2.04 |

¹ 20 mm.

Thus it is seen that the linear or straight chain compounds boil higher, freeze lower, have lower viscosities, and have smaller changes in viscosity with temperature than do the corresponding ring compounds containing the same number of silicon atoms. The more favorable viscosity index of the chain compounds is even more pronounced when examined on a logarithm viscosity-reciprocal temperature chart. These differences indicate the superiority of the chain compounds over the ring compounds as lubricants, particularly at low temperatures. Owing to the practical impossibility of separating the individual pure compounds from each other when the value of $n$ is higher than 8 or 10, comparative data on compounds of higher viscosity is not available, but from an examination of the trends it is believed that, as stated above, the comparison noted above is valid through the entire series of compounds.

EXAMPLE 5

The following mixtures of hexamethyldisiloxane (A), octamethylcyclotetrasiloxane (B), diethyl ether and concentrated sulphuric acid were shaken together at room temperature for periods of time exceeding four hours. The acid was then washed out with water, the ether was removed by distillation, and the remaining oil was heated up to 300° C. to distil out the low boilers, leaving residues of oils of varying viscosities.

| Preparation Number | cc. A | cc. B | cc. ether | cc. H₂SO₄ | cc. Distillate below 300° C. |
|---|---|---|---|---|---|
| I | 0 | 52 | 50 | 9.6 | 11 |
| II | 21 | 52 | 25 | 10 | 16 |
| III | 10 | 52 | 25 | 10 | 5 |
| IV | 10 | 52 | 0 | 10 | 4 |
| V | 4 | 52 | 0 | 10 | 1 |
| VI | 2 | 52 | 0 | 10 | 1 |

The most viscous of all the oils was preparation I, which contained no $(CH_3)_3Si$ groups. Oils of this type are more fully described and claimed in my copending application S. N. 463,815 filed concurrently herewith and assigned to the same assignee as the present invention. As is described in that application, such products consist primarily of cyclic, polymeric dimethyl silanones of the formula $[(CH_3)_2SiO]_x$ wherein $x$ is an integer greater than 10. This material would just barely flow at room temperature. The most fluid of all was II, which contained the greatest amount of $(CH_3)_3Si$ groups, and had a viscosity of about 4 cp. The others increased in viscosity as the proportion of (A) was decreased, up to VI, which had about the viscosity of a medium grade motor oil. When kept at the temperature of solid carbon dioxide (−80° C.) for a day, sample II was very fluid, samples III and IV were less fluid but would pour, while the remainder of the oils were more or less crystalline or solid.

This example illustrates the effect of changing the proportion of hexamethyldisiloxane in the starting material. It is to be noted that although both of the starting materials boil below 200° C. they react to form oils substantially non-volatile at 300° C., which oils will pour at −80° C. It will also be noted that as the proportions of (A) increased, the final products contained greater proportions of chain compounds and smaller proportions of the above-mentioned cyclic compounds resulting in a decrease of the pour points and viscosities of the oily products.

The following example illustrates a method of preparation of an oil of about the viscosity of a light motor oil.

EXAMPLE 6

Ninety-three grams of hexamethyldisiloxane, 593 g. of octamethylcyclotetrasiloxane and 120 cc. of concentrated sulphuric acid were shaken together at room temperature for 20 hours. The lower acid layer was drawn off from a separatory funnel and the upper oily layer was washed free of acid with water, filtered, and dried over anhydrous potassium carbonate. A sample of the light oil thus obtained was placed in a beaker along with a piece of iron and a piece of copper at a temperature of 150° C. After being continuously exposed to the air at this elevated temperature for a period of 6 weeks, the oil remained water-white in color, did not deposit sludge nor develop acidity, and the pieces of metal were not corroded. Under the same circumstances a petroleum oil would have deteriorated badly.

During this period of time, from ¼ to ⅓ of the oil evaporated. In order to avoid this evaporation, the bulk of the oil was placed in a flask, and ⅕ of it was distilled out under vacuum. The residue was somewhat more viscous than the distillate, having the following viscosities at the indicated temperatures.

At 212° F. the oil had a viscosity of 6.7 cp., which increased to 24 cp. on cooling to 68° F., a 3 to 4 fold increase. A petroleum oil of similar viscosity increased in voscosity from about 4 centistokes at 212° F. to about 30 centistokes at 68° F., an increase of 7 to 8-fold. This comparison again shows the superiority of the polysiloxane oils over petroleum oils.

Methylpolysiloxane oils described by this invention are particularly suitable for lubrication under oxidizing conditions at elevated temperatures, at very low temperatures, and in locations where wide temperature fluctuations are experienced.

They should be particularly suitable for the lubrication of instrument bearings by virtue of their freedom from gum formation. They should likewise be particularly useful in locations where it is inconvenient to continually add lubricant to a bearing or where it is inconvenient to clean it.

Their maintenance of water-white color even under extreme oxidizing and sunlight conditions makes these compounds especially suitable for softeners or plasticizers for colorless or light-colored resins or films.

Their stability toward oxidation and discoloration in the presence of copper, as well as their freedom from acid-forming tendencies, makes them particularly suitable for insulating fluids.

What I claim as new and desire to secure by Letters Patent of the United States is:

1. Liquid polysiloxanes having the formula

wherein the various R's represent monovalent hydrocarbon radicals, and $a$ is a whole number equal to at least 3, and in which every oxygen atom is situated between two silicon atoms, every silicon atom is attached through oxygen to at least one other silicon atom, and each terminal silicon atom in the Si—O—Si skeletal structure is joined to three R groups.

2. Liquid, linear polysiloxanes having the formula $R_{(2a+2)}Si_aO_{(a-1)}$ wherein the various R's represent monovalent hydrocarbon radicals and $a$ is a whole number equal to at least 3 and in which each oxygen atom is situated between two silicon atoms, each silicon atom is attached through oxygen to at least one other silicon atom and each terminal silicon atom is joined to three R groups.

3. A methyl polysiloxane chain compound having the formula $R_{(2a+2)}Si_aO_{(a-1)}$ wherein R represents a methyl group, $a$ is a whole number equal to at least 3, the said polysiloxanes being characterized by the fact that every oxygen atom is situated between two silicon atoms, every silicon atom is attached through oxygen to at least one other silicon atom, and each terminal silicon atom in the compound is joined to three R groups, the said compound being a stable liquid.

4. Liquid organo-silicon compounds having the formula

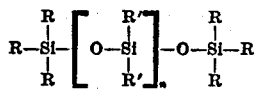

wherein R and R' represent different monovalent hydrocarbon radicals and $n$ is a whole number equal to at least 1.

5. Liquid organo-silicon compounds having the formula

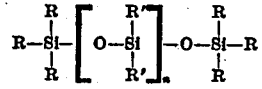

wherein R represents a methyl group, R' a phenyl group, and $n$ is a whole number equal to at least 1.

6. Organo-silicon chain compounds of the formula

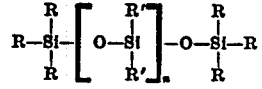

wherein R represents a monovalent hydrocarbon radical, R' represents a monovalent radical selected from the class consisting of the monovalent radicals represented by R and O—Si—R₃ radicals, and $n$ is a whole number and is equal to at least 1, the said compounds being stable liquids at room temperature.

7. Methyl tri-(trimethylsiloxy)silane having the formula

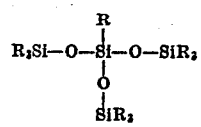

wherein R represents a methyl group, the said silane being a liquid boiling at approximately 190° C.

8. Octamethyltrisiloxane.

9. Symmetrical 1,3-hexamethyl-2-diphenyltrisiloxane.

10. The method of preparing a liquid polysiloxane which comprises forming a mixture of compounds of the formula $R_3SiOSiR_3$ and

wherein the R's represent monovalent hydrocarbon radicals and $x$ is a whole number equal to at least 3, treating said mixture with concentrated sulphuric acid and washing the treated products free of acid.

11. The process of preparing liquid polysiloxane chain compounds having the general formula $R_{(2a+2)}Si_aO_{(a-1)}$ wherein R represents a monovalent hydrocarbon radical and $a$ is a whole number and is equal to at least 3 which comprises hydrolyzing a mixture of organo halogenosilanes having the average formula $R_bSiX_{(4-b)}$ where X represents a chlorine atom and $b$ is a number substantially greater than 2 and less than 3, washing the hydrolysis products with water, drying the washed products and treating the dried products with sulphuric acid.

12. The process of preparing liquid organo-silicon compounds having the formula

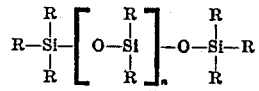

wherein the various (R)s represent monovalent hydrocarbon radicals and $n$ is a whole number and is equal to at least 1, which comprises treating a mixture of an organodisiloxane of the formula $R_3Si$—O—$SiR_3$ and a cyclic organo-silicon polymer having the formula $[R_2SiO]_x$ wherein the various R's have the meanings above indicated and $x$ is a whole number and is equal to at least 3 with concentrated sulphuric acid at room temperature.

13. The process of preparing liquid methyl silicon compounds of the formula

wherein $n$ is a whole number and is equal to at least one, which comprises treating a mixture of hexamethyldisiloxane and a cyclic polymer of dimethyl silanone with concentrated sulphuric acid and thereafter washing the reaction products to remove the acid.

14. The process of preparing liquid methyl phenyl siloxanes having the formula

wherein $n$ is a whole number and is equal to at least one, which comprises treating a mixture of hexamethyldisiloxane and diphenylsilanediol with sulphuric acid and washing the reaction products with water to remove the acid.

15. A composition of matter comprising a liquid mixture of methyl polysiloxane branched chain compounds of the formula $$(CH_3)_{2a+2}Si_aO_{(a-1)}$$

wherein $a$ is a whole number equal to at least 3 and in which every oxygen atom is situated between two silicon atoms, every silicon atom is attached through oxygen to at least one other silicon atom, and each terminal silicon atom in the Si—O—Si skeletal structure is joined to three methyl groups, at least some of the silicon atoms in said polysiloxane compounds being connected through oxygen to three other silicon atoms.

16. A composition of matter comprising a liquid mixture of methyl polysiloxanes having the formula $(CH_3)_{2a+2}Si_aO_{(a-1)}$ wherein $a$ is a whole number equal to at least 3 and in which every oxygen atom is situated between two silicon atoms, every silicon atom is attached through oxygen to at least one other silicon atom, and each terminal silicon atom in the Si—O—Si skeletal structure is joined to three methyl groups, the said mixture including branched chain methyl polysiloxanes wherein some of the silicon atoms are connected to three oxygen atoms.

17. A liquid mixture of methyl polysiloxanes boiling about 300° C. and having the formula $(CH_3)_{2a+2}Si_aO_{(a-1)}$ wherein $a$ is a whole number greater than 5 and in which each oxygen atom is situated between two silicon atoms, each silicon atom is attached through oxygen to at least one other silicon atom, and each terminal silicon atom is joined to three methyl groups.

18. A liquid composition of matter comprising a liquid mixture of organo polysiloxanes having the formula $R_{(2a+2)}Si_aO_{(a-1)}$ wherein R represents a methyl radical, and $a$ is a whole number equal to at least 3 and in which every oxygen atom is situated between two silicon atoms, every silicon atom is attached through oxygen to at least one other silicon atom, and each terminal silicon atom in the Si—O—Si skeletal structure is joined to three R groups.

19. Liquid organo-siloxanes of the formula

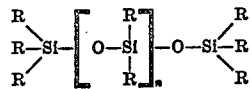

wherein each R stands for a monovalent hydrocarbon radical and $n$ stands for a positive integer.

20. Liquid organo-siloxanes of the formula

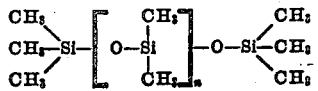

wherein $n$ is a positive integer.

21. Liquid organo-siloxanes corresponding to the formula

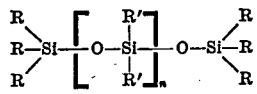

where R and R' each represents a monovalent hydrocarbon radical, at least one R' being a phenyl radical, and $n$ represents a positive integer.

22. Liquid organo-siloxanes corresponding to the formula

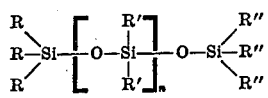

where R, R' and R" each represents a monovalent hydrocarbon radical, at least one R and at least one R" each being a methyl radical, at least one R' being a phenyl radical, and $n$ represents a positive integer.

23. The method of interacting a liquid polymeric organo-siloxane whose structural units correspond substantially to the formula $R_2SiO$ and an organo-siloxane having the general formula $R_3SiOSiR_3$, where each R represents a monovalent hydrocarbon radical, which comprises treating a mixture of said siloxanes with a strong acid.

24. The method which comprises treating a mixture of hexamethyldisiloxane and a liquid polymeric dimethyl silicone with a strong acid.

WINTON I. PATNODE.

REFERENCES CITED

The following references are of record in the file of this patent:

UNITED STATES PATENTS

| Number | Name | Date |
| --- | --- | --- |
| 2,129,281 | Lincoln | Sept. 6, 1938 |
| 2,258,218 | Rochow | Oct. 7, 1941 |

OTHER REFERENCES

Ladenburg, "Annalen," vol. 164, pages 325–328.
Kipping, "J. Chem. Soc.," vol. 79, pages 455–458.
Burk, "Polymerization," 1937, pages 62–64.
Hyde, "Jour. Am. Chem. Soc.," vol. 63, pages 1194–1196 (1941).
Martin and Kipping, "Jour. Chem. Soc." (London), vol. 95, pages 313–4 (1909).
Stock, "Chem. Abstracts," vol. 13, page 2536.
Rochow, "Jour. Am. Chem. Soc.," vol. 63, pages 798–800 (1941).
Emeleus, "Jour. Chem. Society," London (1944), pages 454–456.